United States Patent
Smith et al.

[11] Patent Number: 5,815,484
[45] Date of Patent: Sep. 29, 1998

[54] COPY PROTECTABLE OPTICAL MEDIA DEVICE AND METHODOLOGY THEREFOR

[75] Inventors: Jerry R. Smith, Littleton, Colo.; Hilary S. Lackritz, Half-Moon Bay, Calif.; Mark McLaughlin, Baton Rouge, La.; J. Bradford Merry, Annapolis, Md.

[73] Assignee: Hide and Seek Technologies L.L.C., Nederland, Colo.

[21] Appl. No.: 780,098

[22] Filed: Dec. 24, 1996

Related U.S. Application Data

[60] Provisional application No. 60/009,325 Dec. 28, 1995.

[51] Int. Cl.[6] .................................................... G11B 7/00

[52] U.S. Cl. .................................... 369/275.1; 369/275.2; 369/100; 369/47; 369/13

[58] Field of Search .............................. 369/275.2, 275.1, 369/275.5, 84, 100, 13, 47, 58, 59

[56] References Cited

U.S. PATENT DOCUMENTS

| | | |
|---|---|---|
| 4,677,604 | 6/1987 | Selby, III et al. ........................ 369/33 |
| 5,400,319 | 3/1995 | Fite et al. .............................. 369/275.5 |
| 5,538,773 | 7/1996 | Kondo .................................... 428/64.1 |
| 5,572,589 | 11/1996 | Waters et al. ................................ 380/4 |
| 5,587,984 | 12/1996 | Owa et al. ................................ 369/103 |
| 5,598,399 | 1/1997 | Ogihara et al. ...................... 369/275.2 |
| 5,608,717 | 3/1997 | Ito et al. .............................. 369/275.3 |
| 5,644,566 | 7/1997 | Nakeyama et al. .................. 369/275.2 |
| 5,661,703 | 8/1997 | Moribe et al. ............................. 369/14 |
| 5,671,202 | 9/1997 | Brownstein et al. ..................... 369/58 |
| 5,681,633 | 10/1997 | Onagi et al. ..................... 369/275.2 X |

Primary Examiner—Muhammad N. Edun
Attorney, Agent, or Firm—Sheridan Ross P.C.

[57] ABSTRACT

Data storage media for use with optical scanning machines are adapted to limit access to information stored thereon. Optical disks are used in an optical readout system of a computer to limit continual access to stored data by the optical readout system. A method is provided for limiting access to data stored in an optical media environment.

38 Claims, 4 Drawing Sheets

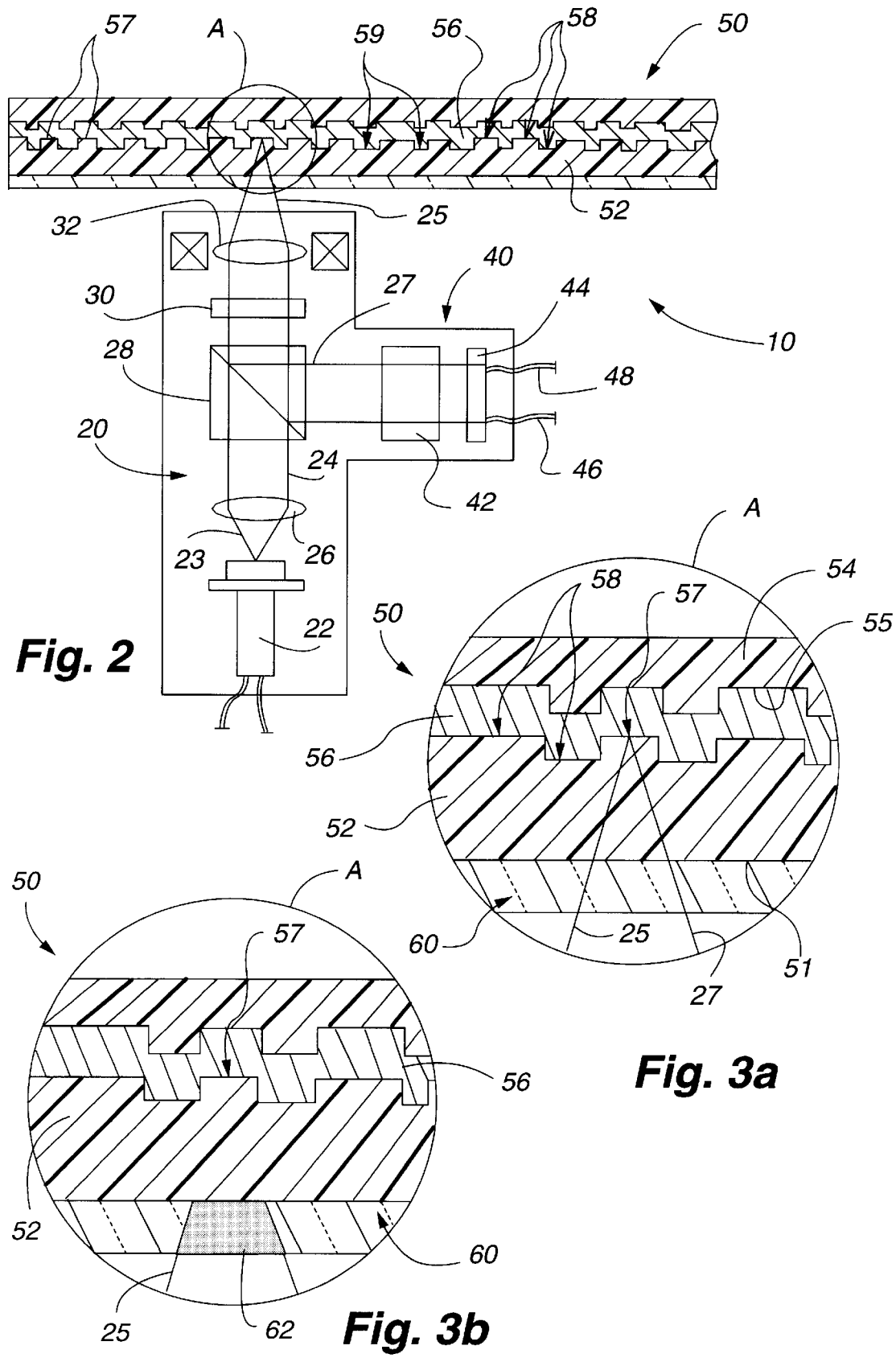

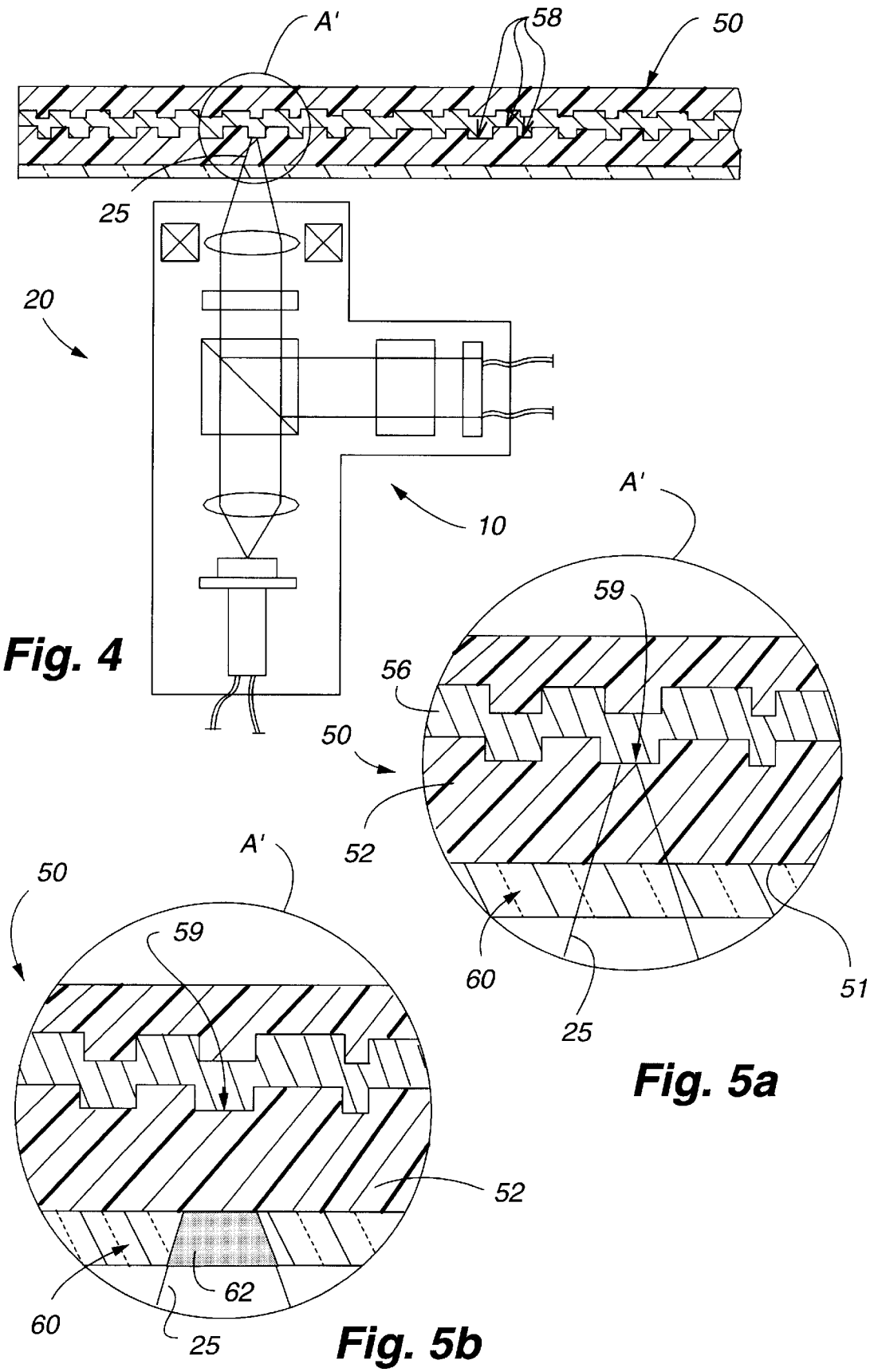

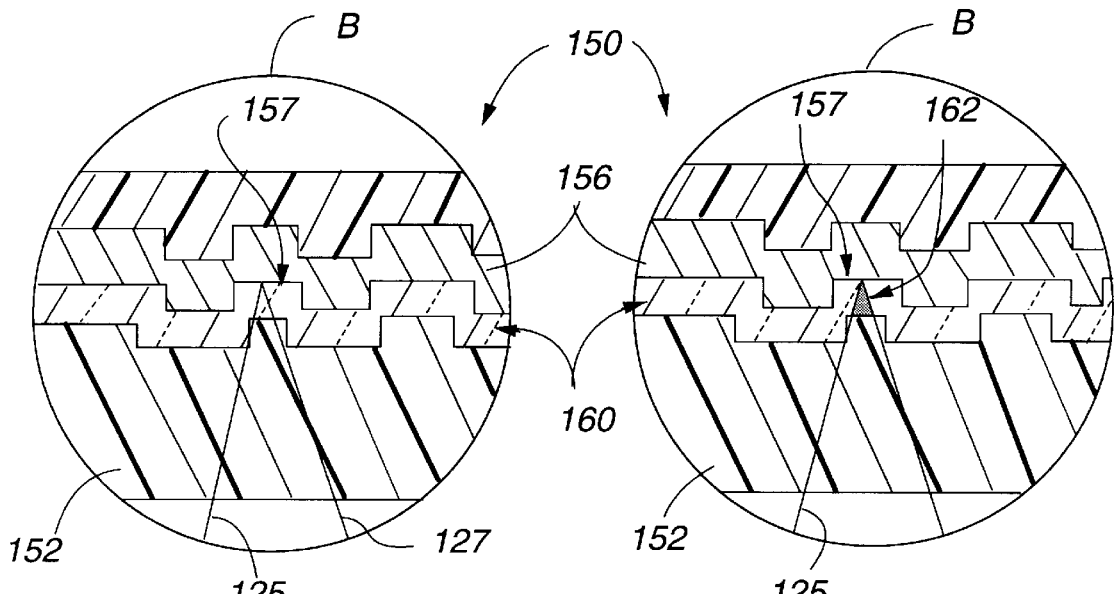
Fig. 6a  Fig. 6b
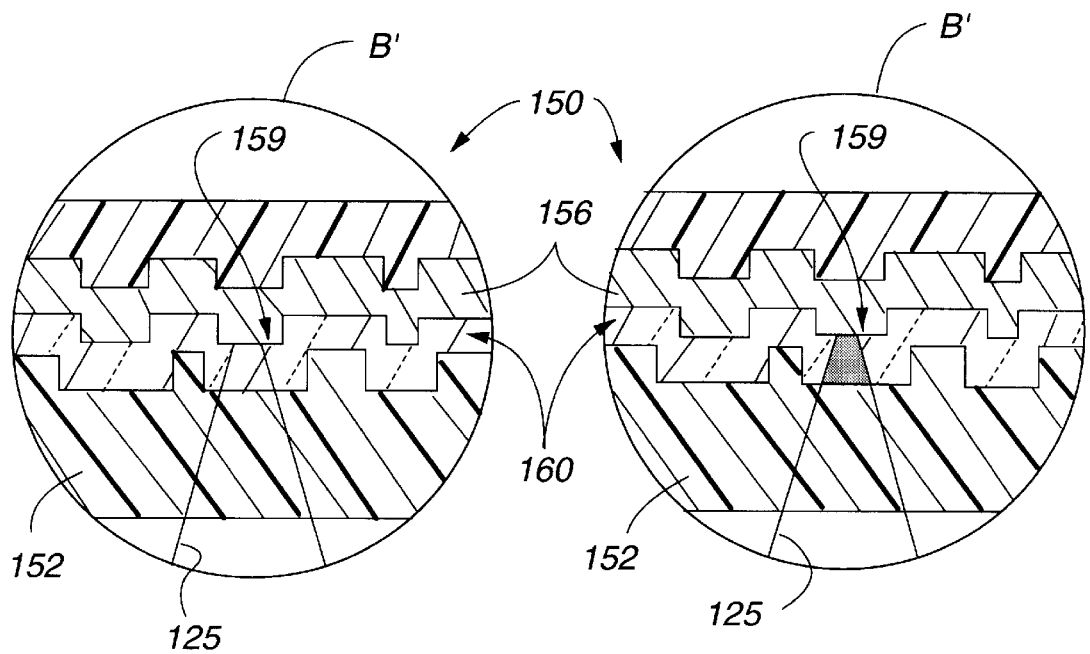
Fig. 7a  Fig. 7b

COPY PROTECTABLE OPTICAL MEDIA DEVICE AND METHODOLOGY THEREFOR

RELATED APPLICATION

This application claims the benefit of U.S. Provisional application Ser. No. 60/009,325, filed Dec. 28, 1995.

FIELD OF INVENTION

The present invention broadly relates to data storage media for use with optical scanning machines, which data storage media are adapted to limit access to information stored thereon. More particularly, the present invention concerns optical disks for use in an optical readout system of a computer to limit continual access to stored data by the optical readout system. A method is also provided for limiting access to data stored in an optical media environment.

BACKGROUND OF THE INVENTION

The computer industry has long been plagued by the illegal misappropriation of software products. The Software Publisher's Association (SPA), an organization with devotes significant resources to tracking and analyzing piracy problems, has determined that in 1994 alone the personal computer software industry lost in excess of $8 billion due to illegal copying of business application software. The SPA further estimated that virtually half of the business software in use in 1994 was pirated, and this estimate does not include the illegal copying of operating systems, education, entertainment or personal productivity software. The piracy problem is particularly acute in more developed markets such as the United States.

Many approaches have been implemented by software producers in an effort to combat piracy. Some of these approaches include encryption, special data formatting, complex installation procedures, and passwords, to name only a few. Unfortunately, end-user resistance to these anti-piracy schemes has been high because they are plagued by one or more limitations, such as an inability to "try before you buy", restrictions on the generation of legitimate back-up copies, and password protection techniques which fail once the password is divulged or discovered. The inability of copy protection schemes to win end-user acceptance has been so extreme that many publishers have simply abandoned the effort, choosing instead to rely on the integrity of their customers to abide by copyright laws.

The misappropriation of software is rampant irrespective of whether the data storage medium is magnetic or optical. Magnetic storage disks are particularly susceptible to piracy. Commercially available magnetic disks, such as the conventional floppy disk, are read/write/erase memory devices in which data is stored in a magnetizable surface layer as discrete patterns of magnetism. Information is stored and retrieved by a read/write head which contains a coil wound around an iron core.

While the magnetic recording medium remains the most popular, there has been a growing trend in recent years to utilize an optical media environment for the storage and retrieval of data. The reason for this trend is readily apparent. A commercially available magnetic floppy disk is only capable of storing 1.44Mb of data, whereas an optical CD-ROM of the same size can have a capacity in excess of 600Mb.

In a typical optical disk for use in a computer's optical readout system, data is stored as a series of lands and pits. This is accomplished by stamping along spiral tracks on a transparent plastic disk, overlaying this with a reflective coating, and thereafter superimposing a protective layer over this coating. Light from a semi-conductor laser is directed toward the lands and pits from below and the reflected light impinges upon a photodetector which converts the presence or absence of the pits into a binary electrical signal. Because the focused laser spot is so minute, the amount of information that can be stored onto the surface of the disk is immense. Adjacent tracks need only be spaced apart by approximately 1.6 microns and, hence, approximately 40,000 tracks may be available on a conventional 120 mm diameter (5 inch) optical disk. The electrical signals delivered to the optical readout system correspond to the magnitude of reflected light which either increases or decreases due to interference and/or diffraction by the preformatted data structures.

In the 1970's, researchers began attempting to encode information on optical disks with lasers, and the video disk was subsequently developed. In the 1980's, more sensitive materials that could be encoded with a low power diode laser were developed. Such a diode laser, operating at a wavelength of approximately 800 nm, is now universally employed to read audio and computer CD's. Following the advent of compact disks which are capable of being read with a laser diode, researchers have now endeavored to develop a marketable compact disk upon which data can be recorded by an end user. The benefit of this capability, as discussed above, is that optical laser recording provides a much higher information density than magnetic recording.

Presently, there is a write once and read many times (WORM) compact disk. This compact disk utilizes a dye that irreversibly changes state when exposed to a high power laser diode and maintains this state when read with a low power reading laser. As such, detection of the encoded data by the optical readout system is unaffected.

It is anticipated that the next generation of optical disks will be capable of being written on, read, erased and rewritten on, etc. many times, similar to a magnetic disk. A photochromic material is attractive for this purpose. Photochromism is the phenomenon whereby the absorption spectrum of a molecule or crystal changes reversibly or irreversibly when the material is irradiated by light possessing certain wavelengths. Thus, for example, a colorless compound may change its molecular state to a quasistable colored state when irradiated by ultraviolet (UV) light, yet be returned to the colorless state upon exposure to visible light. Both organic and inorganic materials which exhibit these properties have been known for years.

Recently, photochromic compounds have attracted much attention in the field of optical recording. As discussed in Jun'Etsu Seto, "Photochromic Dyes", the photochromic materials initially studied for such an application did not have significant sensitivity in the infrared region near 800 nm, the wavelength region of conventional laser diodes. Seto recognizes, however, that a specific class of photochromic compounds, known as spiropyrans (among others) can be manipulated to exhibit improved sensitivity in the infrared region. Others have also recognized this. Specifically, Seto discusses a class of photochromic spiropyrans with benzothiopyran units in the molecular framework and concludes that the synthesized spirobenzothiopyran is well suited to the requirements of erasable optical recording media for systems using conventional laser diodes.

Another dye of the spiropyran class, having the chemical composition 6-nitro-1'3'3'-trimethylspiro-[2H-1- benzothiopyran-2,2'-indoline], or 6-nitro-1-S-BIPS for short, is discussed in Tarkka, Richard U., Talbot, Marc E., et al., "Holographic Storage in a Near-IR Sensitive Photochromic Dye", *Optic Comm.* 109, 54–58 (1994). This article discusses the use of 6-nitro-1-S-BIPS for use in the holography field wherein the dye becomes colored when exposed to light having a wavelength of 780 nm. The film returns to a quasiclear state upon exposure to an ultraviolet light source at 337 nm.

It is anticipated, based on these recent developments, that the conventional magnetic disk will eventually become obsolete due to the recent developments in optical storage technology. Concurrent with this anticipated phaseout of magnetic disks will be a need to adequately address the piracy issues which have for so long plagued the software industry so that the illegal misappropriation of proprietary rights can be thwarted. Accordingly, while past research has concentrated on utilizing photochromic materials for the recording of information on compact disks, the present inventors have realized that similar photochromic materials may also be used to protect the compact disk against illegal copying and distribution. In addition, the present inventors have recognized that certain other photoreactive materials, as well as oxygen reactive materials, may be employed for this purpose. That is, compounds such as these may be used to deny access to a specially coated compact disk beyond one or more authorized uses. Such compounds, when applied as a coating on a disk, would operate to reversibly or irreversibly change its light transmissive properties upon exposure to a low power reading laser, thereby darkening the coating on the disk and rendering data undetectable by an optical readout system. The present invention is directed to meeting this need, among others.

SUMMARY OF INVENTION

It is an object of the present invention to provide a new and useful optical disk which is adapted for use in an optical readout system of a computer that includes a light source operative to produce an interrogating beam of light for reading data structures.

Another object of the present invention is to provide such an optical disk which is particularly adapted to prevent continual access to encoded information thereon by the computer's optical readout system.

A further object of the present invention is to provide a new and useful optical disk which is relatively easy to manufacture without substantial increases in costs.

Yet another object of the present invention is to provide a methodology of limiting access to information stored on an optical medium for use in a computer's optical readout system.

Still a further object of the present invention is to provide an optical disk which is particularly constructed so that an end user would be unaware of the disk copy protection features.

To accomplish these objectives, the present invention in one sense broadly provides for an article of manufacture that is adapted to be encoded with data and further adapted so that duplication of the data by an optical scanning machine may be prevented. The article of manufacture comprises a substrate fabricated from a selected material, with a surface thereof provided with the data. A reactive compound is formed as a coating on at least a portion of the substrate surface. The reactive compound operates to change from an optically transparent state to an optically opaque state in response to irradiation for an accumulated exposure time by light having desired characteristics. As such, light from the optical scanning machine is prevented from penetrating the reactive compound and, thereby rendering the data undetectable by the optical scanning machine.

More particularly, an optical disk is provided which is adapted for use in an optical readout system of a computer that includes a light source operative to produce an interrogating beam of light for reading data structures. Broadly, the optical disk according to the present invention includes a substrate and a metallic layer encoded with information stored as a plurality of data structures that are readable by the interrogating beam of light. The substrate is disposed in a confronting relationship with the metallic layer, and a film of a reactive compound is superimposed over at least some of these data structures. The reactive compound is selected to be of a type which is operative to change physical characteristics in response to a selected stimulus, thereby to affect readability of the data by the interrogating beam.

The reactive compound is disposed between the light source's interrogating beam and the metallic layer. This reactive compound may be interposed between the substrate and the metallic layer and have a thickness in a range of 0.1–10 microns, and preferably 1–5 microns. Alternatively, it may be disposed on an outer surface of the substrate. The metallic layer is preferably contoured to include a sequence of pits and lands which define the plurality of data structures, with the reactive compound superimposed over at least some of these pits and lands.

The selected stimulus to which the reactive compound responds is selected to be either visible light, infrared light, an ambient environment containing light and oxygen, or simply air. Where the stimulus is light alone, the reactive compound may be a photoreactive material and preferably one selected from a spiropyran class of photochromic compounds —for example, 6-nitro-1'3'3'-trimethylspiro-[2H-1benzothiopyran-2,2'-indoline], or 6-nitro-1 -S-BIPS for short, and other related compounds.

Where the stimulus is a combination of light and oxygen, the reactive compound would therefore be photoreactive with oxygen and preferably operate to change its physical characteristics in response to an interrogating beam of light having a wavelength of approximately 650 nanometers (nm), which is encountered with digital versatile disk (DVD) readers.

Where the environmental stimulus is simply air, the reactive compound may be one which is operative after an accumulated duration of time to oxidize and alter an optical characteristic thereof. For example, such a reactive compound would change from an optically transparent condition to an optically opaque condition wherein it absorbs light having a wavelength within a desired range. This wavelength could be either 650 nanometers (nm), as discussed above, but may also be approximately 780 nanometers (nm). The oxidizing reactive compound may be selected from a group of dyes consisting of methylene blue, brilliant cresyl blue, basic blue 3 and toluidine blue 0.

A methodology of limiting access to data stored on an optical medium is also provided. Broadly, this methodology comprises the steps of rotating an optical disk in a disk drive at a selected rotational speed, with the optical disk including a substrate and metallic layer encoded with information stored thereon as a plurality of readable data structures. A reactive compound is preferably superimposed over at least some of these data structures and this reactive compound operates in an ambient environment containing oxygen to change optical transmission in response to irradiation for an accumulated duration of time by light having a beam wavelength that is within a selected range. An interrogating beam of light having a beam wavelength that is within the selected range is directed toward the substrate and through the reactive compound for the accumulated duration of time.

The step of directing the interrogating beam may be accomplished by directing the beam toward the substrate for a continuous interval of time that is sufficient to cause the change in optical transmission. Alteratively, the interrogating beam may be directed toward the substrate for a plurality of discrete intervals of time sufficient to cause such change. Where this is the case, it is contemplated that the interrogating beam may be selectively advanced radially across an outermost surface of the optical disk until the beam interacts with the reactive compound for the plurality of discrete intervals of time. The interrogating beam's wavelength may be approximately 780 nanometers (nm) where a CD-ROM optical disk is utilized, or have a wavelength of approximately 650 nanometers (nm) which is the wavelength employed for digital versatile disks (DVD). Preferably, the interrogating beam also has an intensity of approximately 1 milliwatt (mW) of power, which is typically encountered in conventional optical readers.

These and other objects of the present invention will become more readily appreciated and understood from a consideration of the following detailed description of the exemplary embodiments of the present invention when taken together with the accompanying drawings, in which:

BRIEF DESCRIPTION OF DRAWINGS

FIG. 2 is a side view in elevation, and in partial cross-section, showing the optical readout system's interrogating beam positioned beneath a first type of data structure stored on an optical disk according to a first exemplary embodiment of the present invention;

FIG. 3(a) is an enlarged cross-sectional view of area "A" in FIG. 2;

FIG. 3(b) is an enlarged cross-sectional view of area "A" in FIG. 2 after an accumulated duration of time so that the reactive compound associated with the optical disk of the first exemplary embodiment of the present invention has undergone a change in its physical characteristics;

FIG. 4 is a side view in elevation, and in partial cross-section, showing the optical readout system's interrogating beam positioned beneath a second type of data structure stored on the optical disk according to the first exemplary embodiment of the present invention;

FIG. 5(a) is an enlarged cross-sectional view of area "A'" in FIG. 4;

FIG. 5(b) is an enlarged cross-sectional view of area "A'" in FIG. 4 after an accumulated duration of time so that the reactive compound associated with the optical disk of the first exemplary embodiment of the present invention has undergone a change in its physical characteristics;

FIG. 6(a) is an enlarged cross-sectional view of an area "B" of an optical disk according to a second exemplary embodiment of the present invention, with the optical readout system's interrogating beam positioned beneath a first type of data structure stored thereon;

FIG. 6(b) is an enlarged cross-sectional view of the same area "B" after an accumulated duration of time so that the reactive compound associated with the optical disk according to the second exemplary embodiment of the present invention has undergone a change in its physical characteristics;

FIG. 7(a) is an enlarged cross-sectional view of an area "B'" of an optical disk according to a second exemplary embodiment of the present invention, with the optical readout system's interrogating beam positioned beneath a second type of data structure stored thereon;

FIG. 7(b) is an enlarged cross-sectional view of the same area "B'" after an accumulated duration of time so that the reactive compound associated with the optical disk according to the second exemplary embodiment of the present invention has undergone a change in its physical characteristics.

DETAILED DESCRIPTION OF THE EXEMPLARY EMBODIMENTS

The present invention is, in one sense, directed to an optical disk for use in a computer's optical readout system, which optical disk is constructed to prohibit continual access to stored information by the readout system. As such, the optical disk of the present invention is particularly adapted as an alternative approach for combatting the growing piracy problems resulting from the illegal misappropriation of software products. As will be appreciated, the present invention is also directed to a methodology for limiting access to data stored in an optical media environment. While both the optical disk of the present invention and the methodology for utilizing the same in a computer's optical readout system (also referred to as a laser serve system) is described herein with reference to a conventional CD-ROM disk, the ordinarily skilled artisan would readily appreciate that the teachings of the present invention may also be applied to other types of optical disks, such as audio CD's, WORM (Write Once Read Many) optical disks, and DVD (Digital Versatile Disks), to name only a few.

Figure 1:
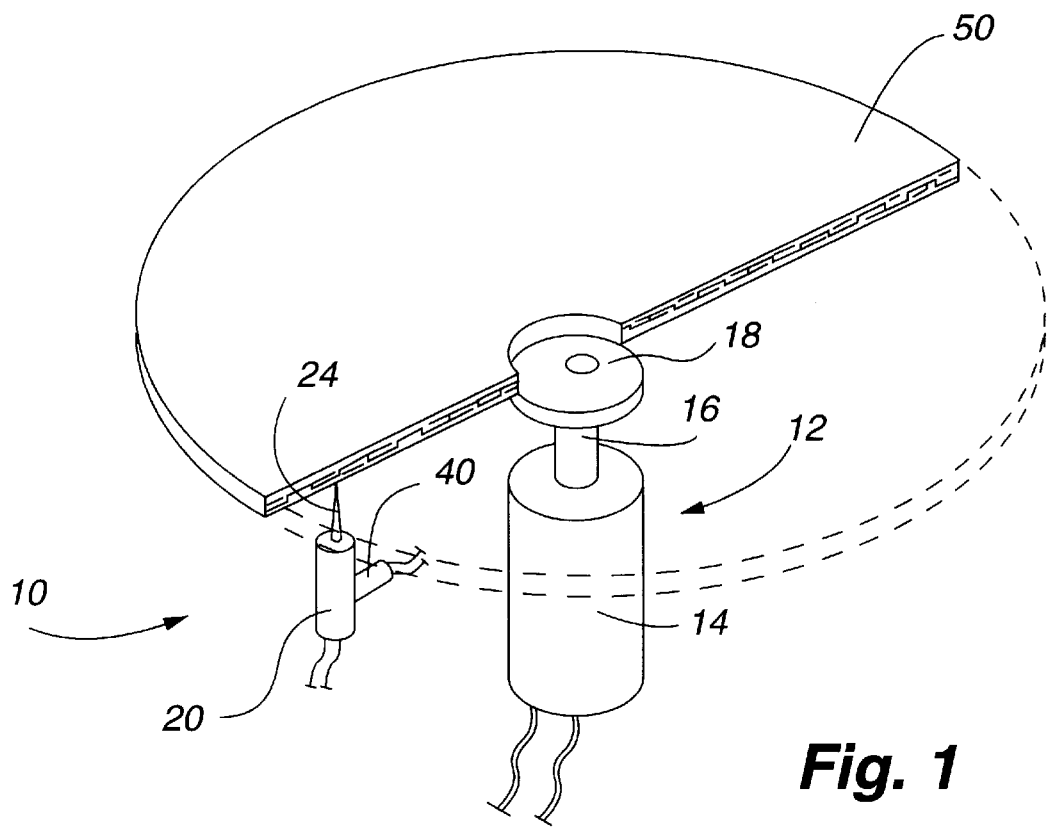
FIG. 1 is a perspective view of an optical readout system utilizing an optical disk (shown in partial phantom) according to the present invention.

With this in mind, then, a typical optical readout system 10 of a computer incorporating an optical disk according to a first exemplary embodiment of the present invention is introduced in FIGS. 1 and 2. Optical readout system 10 broadly includes a disk drive 12 which is operative to rotate an optical disk 50 at a selected rotational speed, a light source 20 for producing an interrogating beam of light and a detector 40 which is operative to collect a returned component of the interrogating beam and to produce an output signal correlated to this returned component.

More specifically, and as is known in the art, disk drive 12 includes a motor 14 comprising a drive shaft 16 and a spindle 18 to which the CD-ROM optical disk 50 is mounted, and this motor 14 operates to constantly vary the rate at which the optical disk 50 is spun so that, regardless of where detector 40 is located in relation to the radius of optical disk 50, the portion of disk 50 located immediately above detector 40 is always moving at the same rate. Unlike conventional magnetic disks, which are divided radially into sectors and spun at a constant angularly velocity, data on a CD-ROM disk is typically contained in a single track that spirals from the center of the disk to its circumference. This track is still divided into sectors, but each sector is the same physical size. Using a method known as constant linear velocity, the disk drive 12 constantly varies the rate at which optical disk 50 spins so that as detector 40 moves toward the center of the optical disk 50, the disk increases its rotational speed. The effect of this is that the optical disk 50 can contain more sectors than a conventional magnetic disk and, consequently, more data.

Light source 20 generates an incident or interrogating beam of light via laser diode 22 and this beam 23 is initially collimated by collimator 26. Collimated beam 24 is then directed toward a polarized beam splitter, or prism 28, after which it is sent through a quarter wave plate 30. Alternatively, for optical readout systems wherein the laser diode 22 and collimator 26 are offset in position relative to beam splitter 28, a wedge mirror prism may be employed to direct the beam in an axial direction relative to optical disk 50. After collimated beam 24 encounters quarter wave plate 30 it is thereafter directed through an objective lens 32 and an appropriate focusing coil to produce a concentrated and focused interrogating beam 25.

Focused interrogating beam 25 penetrates a substrate 52 of optical disk 50 and strikes a metallic (reflective) layer 56 that is coated on the substrate 52. Metallic layer 56, itself, is encoded with information stored as a plurality of data structures 58 and is specifically contoured to include a sequence of lands 57 and pits 59 which define these data structures 58. This may be accomplished with a conventional stamping process wherein metallic layer 56 is pressed into substrate 52 to create pits 59. Lands 57 are those areas which are not pressed and remain in their original position. Metallic layer 56 is approximately 1 micron thick and pits 59 are, by design, only one quarter wavelength of the wavelength of interrogating beam 25. Lands 57 and pits 59 correspond to the 1's and 0's used to store data information. The interrogating beam 25 from laser diode 22 is focused at the surface level of lands 57, as shown. Whereas, light that strikes a pit 59 is scattered, light that strikes a land 57 is reflected as a returned beam 27 and directed back through polarized beam splitter 28. Beam splitter 28 deflects the returned beam 27 towards a tracking error detector 42, which controls tracking and focusing of the laser beam to sub-micron levels, and ultimately to light detecting photo diode 44. Light that strikes photo diode 44 generates a small electrical voltage at electrical leads 46, 48 and these voltages are matched against a timing circuit to generate the stream of 1's and 0's that the computer can understand. Accordingly, photo diode 44 converts the presence or absence of lands into an electrical signal.

The construction of a first exemplary embodiment of optical disk 50 may better be appreciated now with reference to FIG. 3(*a*) which is an exploded view of area "A" in FIG. 2. Optical disk 50 is constructed somewhat similarly to CD-ROM disks or audio compact disks now available. That is, as discussed above, optical disk 50 includes a substrate 52 and a metallic layer 56 upon which a protective coating 54 is placed. The metallic layer 56 is formed so that it is encoded with the information stored thereon as the plurality of data structures 58 that are readable by interrogating beam 25. Substrate layer 52, which may be formed out of polycarbonate, is disposed in a confronting relationship with metallic layer 56. As shown, metallic layer 56 is interposed between a lower surface 55 of protective coating 54 and substrate 52.

Unique to the present invention, though, is the inclusion of a film of reactive compound 60 that is superimposed over at least some of data structures 58. This reactive compound 60 is selected to be of a type which is operative to change physical characteristics in response to a selected stimulus, and thereby to affect readability of the information by interrogating beam 25.

In this first exemplary embodiment of optical disk 50, reactive compound 60 is formed as a coating on an outer surface 51 of substrate 52. Alteratively, the reactive compound may be interposed between the metallic layer 56 and the inner surface of substrate 52, as discussed more thoroughly below with reference to FIGS. 7(*a*)–7(*d*). The selected environmental stimulus to which the reactive compound responds, regardless of its location in the optical disk, will also be discussed more thoroughly below with reference to certain classes of chemical materials from which the reactive compound may be chosen. With each of these possibilities, the reactive compound changes its optical transmission characteristics from an optically transparent condition to an optically opaque condition whereby it masks the data structures and affects the integrity of the electrical signal generated by the computer's optical readout system.

For example, FIGS. 3(*a*) and 3(*b*) illustrate how the integrity of the optical readout system's electrical signal is affected when the interrogating beam 25 encounters a land 57. As shown in FIG. 3(*a*), interrogating beam 25 initially is able to penetrate both the reactive compound 60 and substrate 52 to detect the presence of land 57, which for purposes of discussion only, may correspond to data information in the form of the binary 1. Accordingly, interrogating beam 25 is reflected off of the metallic (reflective) layer 56 as a returned beam 27 which is thereafter detected by light detecting photo diode 44, resulting in the generation an electrical signal correlated to land 57.

However, and as may now be seen with reference to FIG. 3(*b*), after an accumulated duration of time, a region 62 of reactive compound 60 changes it physical characteristics to an optically opaque condition whereby interrogating beam 25 is absorbed by the reactive compound 60 and is no longer able to penetrate substrate 52 to detect the presence of land 57. Therefore, light detecting photo diode 44 does not receive a returned beam, as expected, and generates an improper electrical signal to the computer. As far as the optical readout system 10 is concerned, the interrogating beam 25 is positioned directly beneath a pit as opposed to a land, resulting in an incorrect data transferred to the computer.

FIGS. 4 and 5(*a*)–5(*b*) illustrate the situation where interrogating beam 25 is positioned directly beneath a data structure 58 in the form of a pit 59. It may be appreciated that, here, light source 20 has been advanced either radially or circumferentially across outer surface 51 of substrate 52 to a different location as dictated by the computer's program. Looking at the exploded area A' in FIG. 5(*a*) it is seen that interrogating beam 25 is initially able to penetrate both reactive compound 60 and substrate 52 and impinge upon metallic layer 56 which coats land 57. Because reflective material 56 in this region is not positioned at the level of the interrogating beam's focal point, interrogating beam 25 is scattered. Thus, no returned beam is reflected back to photo diode 44, thereby resulting in the generation of a binary electrical signal by detector 40 which corresponds to the presence of the encountered pit 59. This is the expected result.

After an accumulated duration of time, the region 62 of reactive compound 60 which is exposed to interrogating beam 25 becomes darkened or opaque. Light in this region 62 is absorbed and not allowed to penetrate substrate 52 to detect the presence or absence of pit 59. The result is, therefore, the same in that detector 40 generates a binary electrical signal, such as a 0, corresponding to the presence of a pit.

A second exemplary embodiment for the optical disk according to the present invention may now be appreciated with reference to FIGS. 6(a)–6(b) and 7(a)–7(b). Here, the reactive compound 160 of optical disk 150 is shown to be interposed between the substrate 152 and the metallic layer 156. While it is inherently more difficult to manufacture optical disk 150 than it would be to manufacture optical disk 50 with reference to the first exemplary embodiment of the present invention, the construction of optical disk 150 may be preferred from a performance standpoint because reactive compound 160 is located in a region where interrogating beam 125 would have a greater beam intensity than would beam 25 due to its relatively reduced focal width in this region. For all practical purposes, however, the results would nonetheless be the same.

For example, FIG. 6(a) again illustrates the situation where interrogating beam 125 is positioned beneath a land 157 such that the beam is reflected off of metallic layer 156 as a returned beam 127 which would be recognized by the detector and correctly converted into a corresponding binary electrical signal. In FIG. 6(b), on the other hand, it is shown that after an accumulated duration of time, the region 162 of reactive compound 160 which has been exposed to a given environmental stimulus changes its physical characteristics from an optically transparent condition to an optically opaque or darkened condition. As such, interrogating beam 125 is absorbed in region 162 and no returned beam is detected, resulting in the generation of a binary electrical signal by the computer's optical readout system corresponding to the detection of a pit, despite the presence of land 157. In FIGS. 7(a)–7(b) the situation is similar to that discussed above with reference to FIGS. 5(a)–5(b). Thus, when interrogating beam 125 is positioned directly beneath a pit 159, the computer's optical readout system would generate the proper binary electrical signal irrespective of the physical characteristic of reactive compound 160 in region 162.

A. Classes of Materials For the Reactive Compound

Various classes of materials have been found which are believed to exhibit appropriate physical characteristics for utilization in the optical disk according to the exemplary embodiments of the present invention. Each of these materials responds to either a specific environmental condition, or a combination of environmental conditions, to mask the data structures on an optical disk, thereby affecting their readability by the computer's optical readout system.

1. Photo Reactive Compounds

It has been found that photoreactive materials exhibit desired light absorption characteristics and that these materials may be formed as a coating on an optical disk to mask at least some of the disk's data structures from detection by an optical readout system. Photochromes, and specifically the spiropyran class of photochromes, have particular utility. Photochromism is the phenomenon whereby the absorption spectrum of a molecule changes reversibly or irreversibly when the sample is irradiated by light having certain wavelengths. For example, a colorless compound can change to a quasi-stable colored structure when it is irradiated with infrared light. While a specific Photochromic material of the spiropyran class is discussed herein for use in the present invention, the ordinarily skilled artisan would appreciate that other Photochromic materials such as aziridine derivatives, bipyridine derivatives, dihydropyrene derivatives, fulgide derivatives, thioindigo derivatives, azobenzene derivatives, salicylideneaniline derivatives, xanthene derivatives, or oxazine derivatives may also prove useful. One spiropyran class dye, having the chemical composition 6-nitro-1'3'3'-trimethylspiro-[2H-1-benzothiopyran-2,2'-indoline], or 6-nitro-1-5-BIPS for short, is discussed in Tarkka, Richard U.,Talbot, Marc E., et. al, *Holographic Storage in a Near-IR Sensitive Photochromic Dye*—Optic Comm. 109, 54–58 (1994), the teachings of which are incorporated herein by reference. When exposed to infrared light having a wavelength of 780 nanometers (nm), a wavelength which is predominantly utilized in current optical readout systems, this dye becomes colored. The dye may thereafter be returned to its optically transparent state upon exposure to an ultraviolet source at approximately 337 nanometers (nm). This ability to erase the color from the dye is not fatal in that it requires a relatively expensive and difficult to find light source. 6-nitro-1-S-BIPS is preferably applied as a coating to the substrate of an optical disk as illustrated in FIGS. 3–5 above. With this spiropyran derivative, or other appropriate chromophore, it is recognized that the environmental stimulus is simply exposure to the light source's interrogating beam.

2. Compounds Which are Photoreactive in the Presence of Oxygen

Two materials which may also be used in conjunction with the optical disk according to the present invention are photoreactive in the presence of an ambient environment containing oxygen.

a. Compound I

One such material is denoted as Compound I below:

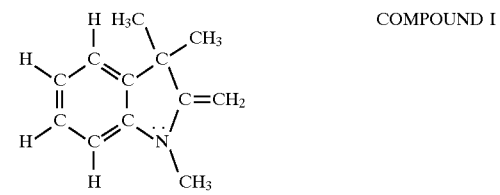

COMPOUND I

Compound 1 is made by treating tetramethylindolium iodide with 10 molar equivalents of 1N sodium hydroxide in water with good mixing. As compound I is formed, it is extracted into the hexane co-solvent according to the following reaction:

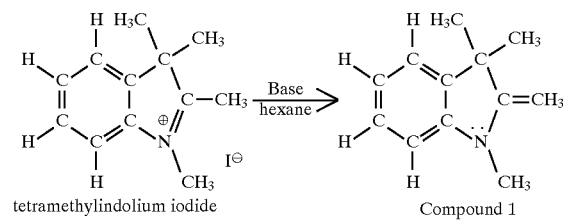

tetramethylindolium iodide    Compound 1

Alternatively, one molar equivalent of triethylamine in dichloromethane can be used and the product can be isolated by extraction with water, evaporation of a solvent and dissolution in hexane. The aqueous base method is preferred in that it yields in excess of 80% of the desired final product.

Compound I is photoreactive with oxygen and sensitive to ambient fluorescent light over several (>18 hrs) exposure, and is quickly (<10 mins) photooxidized upon exposure to an incandescent 150W lamp at a distance of 12 inches. Compound I also reacts upon exposure to light having a wavelength of approximately 650 nanometers (nm) and an intensity approximating that of a digital versatile disk (DVD) player light source. Accordingly, Compound I is useful for application to an optical disk incorporated in developed DVD drives.

b. Compound II

Another material which is photoreactive in the presence of oxygen can be made from quinoline salts and related enamine derivatives. This photoreactive material is denoted as Compound II below and may be prepared, similarly to Compound I, according to the following reaction:

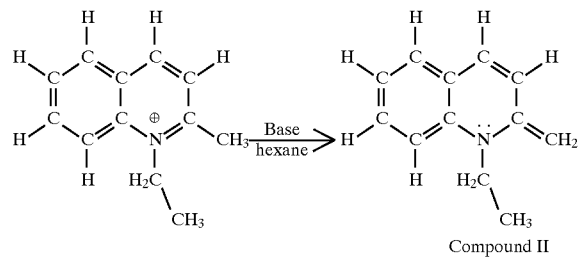

Compound II

With both Compounds I and II above, it should be appreciated that the environmental stimulus which causes them to change optical transmission is a combination of both light and oxygen in air. Moreover, these compounds are specifically adapted for use in a computer's optical readout system which utilizes a light source having a wavelength of 650 nanometers (nm). Because these compounds react to change their light absorption characteristics in the presence of an ambient environment containing oxygen, the required amount of time for such change varies depending upon the wavelength of the ambient light. It is, therefore, desirable that the optical disks coated with either Compounds I or II, be stored in an inert environment, such as a standard hermetic packaging. For example, such an optical disk would preferably be contained in a package in the form of an aluminum bag coated with polyethylene. Within the hermetic packaging would be an inert gaseous environment, such as argon or dry nitrogen.

c. Materials Which Are Reactive In Air

It has also been found that certain oxygen reactive materials may be used in an optical readout system having a light source at a selected wavelength. One class of such materials is based upon the reduced forms of the well known dye, methylene blue. The method of synthesis and the oxygen dependent reoxidation to form the colored form of the methylene blue dye is shown below:

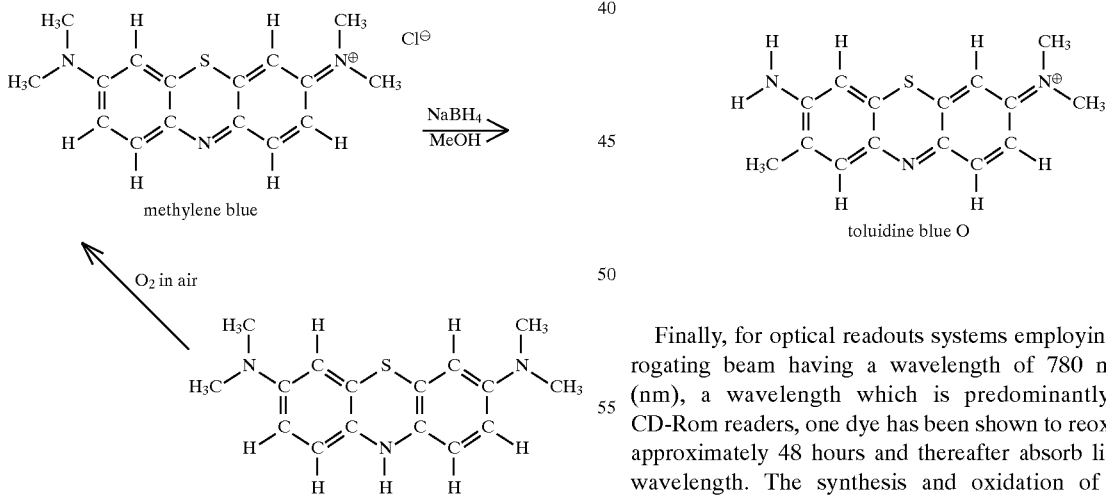

Various reducing agents can be used to reduce methylene blue and its many derivatives, with zinc and acetic acid being one possibility. The color of methylene blue when reduced is pale yellow and it is quickly re-oxidized to dark blue by oxygen in air. The rate of this reaction is somewhat dependent on the medium, however. In polyurethane films, this rate has varied from about 10 minutes to 30 minutes depending on the concentration. When sodium borohydride residue is not quenched in these films, they gradually turn from clear to blue over several hours. The blue form of the methylene blue dye absorbs strongly at 650 nanometers (nm), the centered wavelength for DVD laser light readers.

Other dyes which are reactive in air perform similarly to the methylene blue and have maximum absorbances that can vary by several tens of nanometers. The structures of some of these dyes known to perform like methylene blue and their commercial names are shown below:

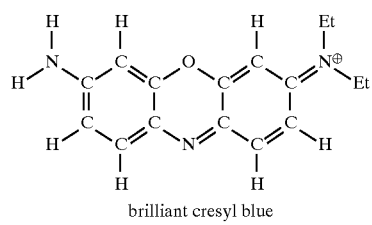

brilliant cresyl blue

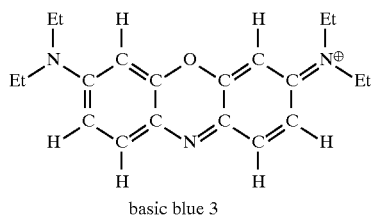

basic blue 3

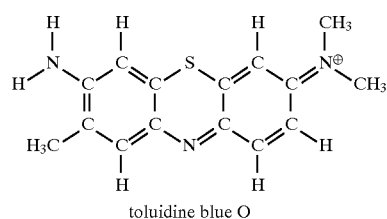

toluidine blue O

Finally, for optical readouts systems employing an interrogating beam having a wavelength of 780 nanometers (nm), a wavelength which is predominantly used in CD-Rom readers, one dye has been shown to reoxidize over approximately 48 hours and thereafter absorb light at this wavelength. The synthesis and oxidation of this dye, denoted as Compound III, is shown below:

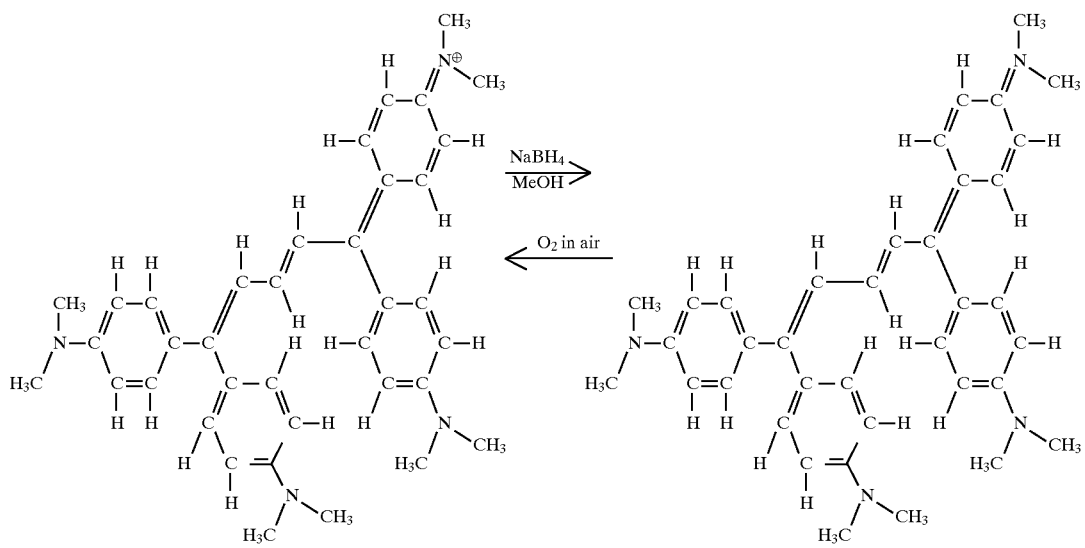

It is certainly comtemplated that numerous other similar dyes can be synthesized to operate effectively in a given optical readout system. With each of the air reactive materials discussed herein, as with those materials discussed above which are photoreactive in an ambient environment containing oxygen, it is desirable to package the optical disk containing the dye in an inert environment as discussed above.

With an understanding of the various compounds which the reactive compound of the present invention may assume, th e ordinarily skilled artisan in this field would readily appreciate that the particular compound selected would depend on a variety of parameters of the operating environment. Where a CD-ROM application is preferred, the reactive compound would necessarily be one that is compatible with this environment, sensitive to the infrared lasers used in the CD-ROM's optical readout system (i.e. 650 nm or 780–830 nm) and will react to the lower powered intensity of the interrogating beam (approximately 0.14 to 0.6 mW of power). For those reactive compounds which are reactive in the presence of oxygen, a user would of course be careful to avoid exposure of the optical disk to an ambient environment containing either oxygen, or light and oxygen, in order to prolong the useful life of the optical disk.

The primary thrust of the present invention is, of course, to deny access to a specially coated optical disk, and preferably a CD-ROM disk, beyond one or more authorized uses. To this end, one potential use for coating an optical disk with a reactive compound would be to allow for sample disks to be given away to customers in order for them to determine whether or not the product is worth purchasing. Once the product has been evaluated, the customer then might be required to return the product to the vendor and buy an adulterated optical disk. Alternatively, a customer could purchase a coated optical disk and load it onto a computer's hard drive prior to the reactive compound changing its physical characteristics and rendering the optical disk unreadable. Another potential application is the rental of optical disks which contain the reactive compound. Such optical disk may be rented, much like video cassettes at a low cost and played until such time as the optical readout system of the disk player is no longer able to detect the presence or absence of the encoded information.

Figure 8:
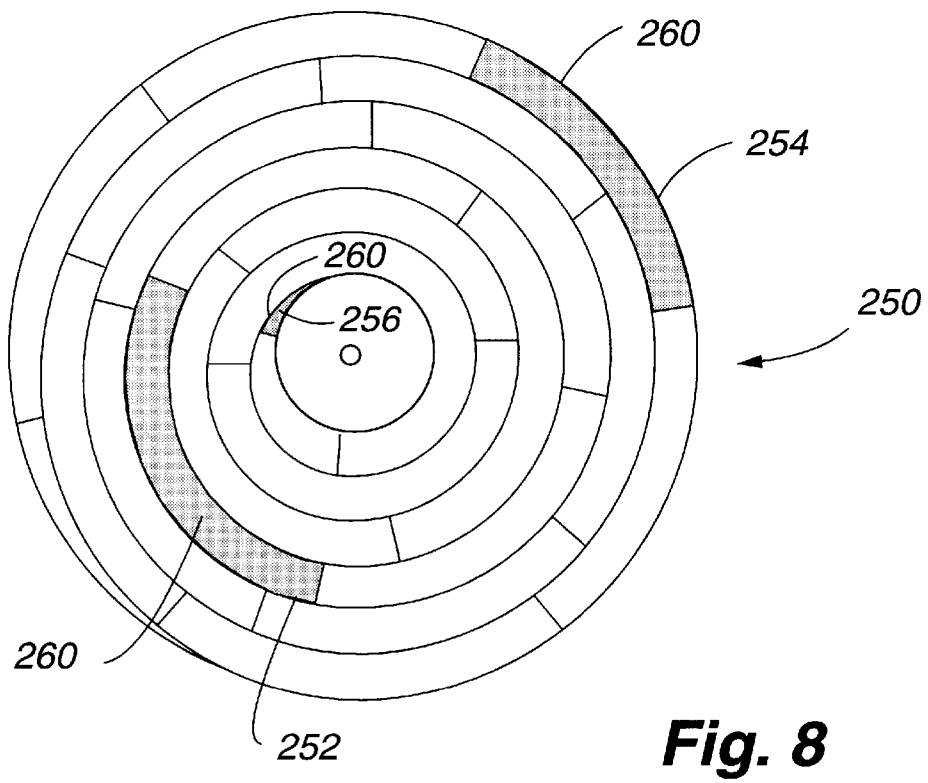
FIG. 8 is a bottom plan view showing a variety of applications for the reactive compound associated with an optical disk according to the present invention.

As shown in FIG. 8, the reactive compound may be applied to the optical disk in a variety of patterns. FIG. 8, of course, only illustrates a few such applications and others are certainly contemplated without departing from the concepts of the present invention. To illustrate, reactive compound 260 may be embossed as a film over an entire sector of optical disk 250, such as representative sectors 252 and 254. Alteratively, the reactive compound 260 may be applied to only a portion of a sector, such as region 256 in FIG. 8. Although, the entire surface of optical disk 250 could be coated with reactive compound 260, this is not a necessity, because the compound could merely be applied to that portion of the disk which contains critical information for the optical readout system to access an order for the software product to function properly.

With specific reference to the spiropyran class of photochromes discussed above, it is also anticipated that a reactive compound of this type, which is adapted to reversibly change between a darkened colored state and a transparent state, could initially be applied in its darkened state to the surface of the optical disk. It is anticipated that a computer program could then be written to operate properly only in the event that the optical readout system continues to process information as if no data were contained in this region. Once the photochrome changes to the transparent condition upon sufficient exposure to light, the optical readout system would be able to detect the plurality of data structures, and the program would then discontinue its proper function.

With the foregoing in mind, the present invention in its broadest sense is directed to an article of manufacturer adapted to be encoded with data and further adapted so that duplication of the data by an optical scanning machine may be prevented. To this end, the article of manufacturer comprises a substrate fabricated from a selected material and having a substrate surface which contains the data. A reactive compound is formed as a coating on at least a portion of the substrate surface and this reactive compound is operative to change from an optically transparent state to an optically opaque state in response to a irradiation for an accumulated duration of time by light having selected characteristics, thereby to prevent the light from the optical scanning machine from penetrating the reactive compound and to render the data undetectable by the machine.

It should also be appreciated from the foregoing that another aspect of the present invention is a methodology of limiting access to data stored in an optical medium. Broadly, this methodology comprises the steps of rotating an optical disk in a disk drive at a selected rotational speed, with the optical disk including a substrate and a metallic layer encoded with information stored thereon as a plurality of readable data structures and including a reactive compound superimposed over at least some of these data structures. The reactive compound is operative in an ambient environment containing oxygen to change optical transmission in response to irradiation for an accumulated duration of time by light having a beam wavelength that is within a selected range. The broad methodology would also include a step of directing an interrogating beam of light having a beam wavelength that is within the selected range toward the substrate and through the reactive compound for the accumulated duration of time.

The step of directing the interrogating beam of light could be accomplished by directing the beam toward the substrate for a continuous interval of time that is sufficient to cause the change in optical transmission. The methodology also contemplates that the interrogating beam can be directed toward the substrate for a plurality of discrete intervals of time sufficient to cause the change in optical transmission. This might occur, for example, where the light source of the computer's optical readout system selectively advances the interrogating beam radially across an outermost surface of the optical disk until the beam interacts with the reactive compound for the plurality of discrete intervals of time. It is preferred that the methodology be practiced with a beam wavelength approximating either 780 or 650 nanometers (nm) and a beam intensity in a range of approximately 0.14 mW to 0.6 mW of power.

Accordingly, the present invention has been described at some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A method of limiting access to data stored on an optical medium, comprising the steps of:
   (a) rotating an optical disk in a disk drive at a selected rotational speed, said optical disk including an area coincident with a substrate and a metallic layer encoded with information stored thereon as a plurality of readable data structures and said area also coincident with a reactive compound superimposed over at least said data structures of said area, said reactive compound intended to be operative in an ambient environment containing oxygen for reacting with the oxygen to change an optical transmission from said area in response to irradiation for an accumulated duration of time by light having a beam wavelength within a selected range; and
   (b) directing an interrogating beam of light having a beam wavelength that is within the selected range toward at least a portion of said area and through said reactive compound for the accumulated duration of time.

2. The method of limiting access to data according to claim 1 wherein said interrogating beam is directed toward said area for a continuous interval of time that is sufficient to cause said change in optical transmission.

3. The method of limiting access to data according to claim 1 wherein said interrogating beam is directed toward said area for a plurality of discrete intervals of time, wherein each of said discrete intervals are spaced apart in time from one another, and wherein no single one of said intervals is sufficient to cause said change in optical transmission, but an accumulation of a length of time of said intervals is sufficient to cause said change.

4. The method of limiting access to data according to claim 1 wherein said beam wavelength is approximately 780 nanometers (nm).

5. The method limiting access to data according to claim 1 wherein said beam wavelength is approximately 650 nanometers (nm).

6. The method of limiting access to data according to claim 1 wherein said step of directing said interrogating beam toward said area is accomplished by selectively advancing said interrogating beam radially across an outermost surface of said optical disk until said interrogating beam interacts with said reactive compound for a plurality of discrete intervals of time sufficient to cause said change optical transmission.

7. A method of limiting access to data according to claim 1 wherein said beam intensity is approximately 1 milliwatt (mW) of power.

8. A method of limiting access to data according to claim 7 wherein said beam wavelength is approximately 780 nanometers (nm).

9. A method as claimed in claim 1, wherein said step of directing purposefully oxidizes said reactive compound.

10. A method as claimed in claim 1, wherein said reactive compound changes between an optically transparent state effective for reading the data structures stored coincidentally with said portion of said area, and an optically opaque state that inhibits reading the data structures stored coincidentally with said portion of said area.

11. An optical disk adapted for use in an optical readout system that includes a light source operative to produce an interrogating beam of light for reading data structures, comprising:
   (a) a metallic layer encoded with information stored thereon as a plurality of data structures that are readable by an interrogating beam of light;
   (b) a substrate disposed in a confronting relationship with said metallic layer;
   (c) a film of a reactive compound superimposed over at least some of said data structures, said reactive compound selected to be of a type which is operative to change, in response to a predetermined stimulus applied to the reactive compound, between:
      (i) an optically transparent state wherein a sufficient amount of said interrogating beam of light penetrating said reactive film compound reflects from the data structures encoded on said metallic layer so that said data structures can be read; and
      (ii) an optically opaque state wherein there is an insufficient amount of said interrogating beam of light penetrating said reactive film compound for reading the data structures via reflections of said interrogating beam of light.

12. An optical disk according to claim 11 wherein said reactive compound is interposed between said metallic layer and said substrate.

13. An optical disk according to claim 12 wherein said metallic layer is contoured to include a sequence of pits and lands which define said plurality of data structures, said reactive compound superimposed over at least some of said pits and lands.

14. An optical disk according to claim 11 wherein said reactive compound is supported on an outer surface of said substrate and has a thickness in a range of approximately 0.14 to 0.6 microns.

15. An optical disk according to claim 11 wherein said predetermined stimulus is selected from a group consisting of visible light, infrared light, an ambient environment containing light and oxygen, and air.

16. An optical disk according to claim 15 wherein said predetermined stimulus is light and wherein said reactive compound includes a photoreactive material that changes its chemical composition when at least exposed to air.

17. An optical disk according to claim 16 wherein said reactive compound is selected from a spiropyran class of photochromic compounds.

18. An optical disk according to claim 17 wherein said reactive compound is 6-nitro-1'3'3'-trimethylspiro[2H-1-benzothiopyran-2,2'-indoline].

19. An optical disk according to claim 18 wherein said reactive compound is operative to change to an optically darkened state in response to an interrogating beam wavelength of approximately 780 nanometers (nm) and thereafter return to an optically clear state in response to irradiation by a beam of light having a wavelength of approximately 337 nanometers (nm).

20. An optical disk according to claim 15 wherein said predetermined stimulus is an ambient environment containing light and oxygen and wherein said reactive compound has the chemical formula:

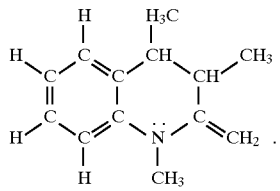

COMPOUND I

21. An optical disk according to claim 15 wherein said predetermined stimulus is an ambient environment containing light and oxygen and wherein said reactive compound has the chemical formula:

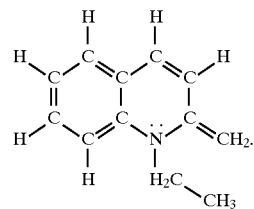

COMPOUND II

22. An optical disk according to claim 15 wherein said predetermined stimulus is air and wherein said reactive compound is operative after an accumulated duration of time to oxidize and change said state of the reactive compound.

23. An optical disk according to claim 22 wherein said reactive compound absorbs light having a wavelength within a predetermined range effective for facilitating a change between the transparent and opaque states of said reactive compound.

24. An optical disk according to claim 23 wherein said wavelength is approximately 780 nanometers (nm).

25. An optical disk according to claim 23 wherein said wavelength is approximately 650 nanometers (nm).

26. An optical disk according to claim 22 wherein said reactive compound is a chemically reduced form of a dye.

27. An optical disk according to claim 26 wherein said reactive compound is selected from a group of dyes consisting of methylene blue, brilliant cresyl blue, basic blue 3 and toluidine blue 0.

28. In an optical disk for use in an optical readout system wherein said optical disk includes a metallic layer encoded with information stored thereon as a plurality of data structures and a substrate, and wherein said optical readout system includes: a disk drive operative to rotate the optical disk at a selected rotational speed, a light source operative to produce an interrogating beam of light at a selected beam wavelength and at a selected beam intensity and to direct said interrogating beam of light at the data structures, and a detector operative to collect a returned component of said interrogating beam and to produce an output signal in response thereto, an improvement comprising a film of a reactive compound superimposed over at least some of said data structures, said reactive compound operative to produce a change in its physical characteristics between:
(i) an optically transparent state wherein a sufficient amount of said interrogating beam of light penetrating said reactive compound reflects from at least some of the data structures encoded on said metallic layer so that said at least some of the data structures can be read; and
(ii) an optically opaque state wherein there is an insufficient amount of said interrogating beam of light penetrating said reactive compound for reading said at least some of the data structures via reflections of said interrogating beam of light;
wherein said change is in response to a predetermined environmental stimulus for affecting a readability of said at least some data structures by the interrogating beam of light.

29. The improvement of claim 28 wherein said reactive compound is responsive to irradiation by the interrogating beam for an accumulated duration of time to intentionally change a chemical characteristic of said reactive compound when said reactive compound changes between said states.

30. An article of manufacture adapted to be encoded with data and further adapted so that duplication of the data by an optical scanning machine may be prevented, comprising:
(a) a substrate fabricated from a selected material and having a substrate surface which contains the data; and
(b) a reactive compound coating at least a portion of said substrate surface, said reactive compound operative to change from an optically transparent state to an optically opaque state in response to irradiation for an accumulated duration of time by infrared light having desired characteristics, thereby to prevent light from the optical scanning machine from penetrating said reactive compound and to render the data undetectable by the optical scanning machine.

31. A method of limiting access to data stored on an optical disk having: (a) a substrate, (b) a metallic layer encoded with information capable of being read by detecting optical reflections from said metallic layer; and (c) a reactive layer through which the radiation passes prior to being reflected for reading the information, comprising:
exposing said reactive layer to a predetermined environmental stimulus for changing an optical characteristic of said reactive layer between the following states of (i) and (ii):
(i) an optically transparent state, wherein effective reading of the information is capable of being performed by detecting optical reflections of the radiation; and
(ii) an optically opaque state, wherein for at least a predetermined portion of said information, said optical reflections of said portion are sufficiently reduced so as to preclude reading of said information;
activating an optical disk reader for reading said information from said optical disk by detecting reflections of the radiation directed at said metallic layer;

reading said information when said reactive layer is in a transparent state;

failing to read said information when said reactive layer is in said opaque state.

32. A method as claimed in claim 31, wherein said optical disk reader is a read-only device.

33. A method as claimed in claim 31, wherein said step of exposing is performed during a reading of said information from said optical disk.

34. An optical disk adapted for use in an optical readout system that includes a light source operative to produce an interrogating beam of light for reading data structures, comprising:

(a) a metallic layer encoded with information stored thereon as a plurality of data structures that are readable by an interrogating beam of light;

(b) a substrate disposed in a confronting relationship with said metallic layer;

(c) a film of a reactive compound superimposed over at least some of said data structures, said reactive compound selected to be of a type which is operative to change physical characteristics in response to a selected stimulus thereby to affect readability of the data structures by said interrogating beam of light;

wherein said stimulus is light and wherein said reactive compound is a photoreactive material selected from a spiropyran class of photochromic compounds.

35. An optical disk according to claim 34, wherein said reactive compound is 6-nitro-1'3'3'-trimethylspiro.

36. An optical disk according to claim 35, wherein said reactive compound is operative to change to an optically darkened state in response to an interrogating beam wavelength of approximately 780 nanometers (nM) and thereafter return to an optically clear state in response to irradiation by a beam of light having a wavelength of approximately 337 nanometers (nM).

37. An optical disk adapted for use in an optical readout system that includes a light source operative to produce an interrogating beam of light for reading data structures, comprising:

(a) a metallic layer encoded with information stored thereon as a plurality of data structures that are readable by an interrogating beam of light;

(b) a substrate disposed in a confronting relationship with said metallic layer;

(c) a film of a reactive compound superimposed over at least some of said data structures, said reactive compound selected to be of a type which is operative to change physical characteristics in response to a selected stimulus thereby to affect readability of the data structures by said interrogating beam of light;

wherein said stimulus is an ambient environment containing light and oxygen and wherein said reactive compound has the chemical formula:

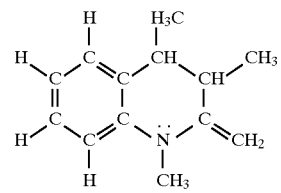

COMPOUND I

38. An optical disk adapted for use in an optical readout system that includes a light source operative to produce an interrogating beam of light for reading data structures, comprising:

(a) a metallic layer encoded with information stored thereon as a plurality of data structures that are readable by an interrogating beam of light;

(b) a substrate disposed in a confronting relationship with said metallic layer;

(c) a film of a reactive compound superimposed over at least some of said data structures, said reactive compound selected to be of a type which is operative to change physical characteristics in response to a selected stimulus thereby to affect readability of the data structures by said interrogating beam of light;

wherein said stimulus is an ambient environment containing light and oxygen and wherein said reactive compound has the chemical formula:

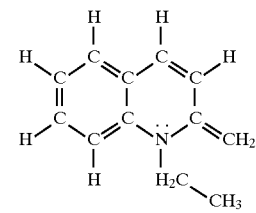

COMPOUND II

* * * * *